United States Patent [19]

Szwargulski et al.

[11] Patent Number: 4,974,570

[45] Date of Patent: Dec. 4, 1990

[54] FUEL SUPPLY MODULE

[75] Inventors: Jesse L. Szwargulski, Florissant; Larry L. Lachalmelle, St. Louis; John B. Fitzgerald, St. Louis; Gregory B. Schoenberg, Sunset Hills, all of Mo.

[73] Assignee: Carter Automotive Company, Inc., St. Louis, Mo.

[21] Appl. No.: 348,232

[22] Filed: May 5, 1989

[51] Int. Cl.⁵ .................. F02M 39/00; F02M 37/10
[52] U.S. Cl. ..................... 123/509; 123/514; 137/565; 137/572; 137/113
[58] Field of Search ........... 123/509, 510, 514, 198 D; 137/576, 574, 572, 565, 113

[56] References Cited

U.S. PATENT DOCUMENTS

| 3,443,519 | 5/1969 | White . | |
|---|---|---|---|
| 4,546,750 | 10/1985 | Brunnell | 123/509 |
| 4,651,701 | 3/1987 | Weaver | 123/509 |
| 4,672,937 | 6/1987 | Fales | 123/509 |
| 4,694,857 | 9/1987 | Harris | 137/574 |
| 4,747,388 | 5/1988 | Tuckey | 123/514 |
| 4,776,315 | 10/1988 | Greiner | 123/509 |
| 4,780,063 | 10/1988 | Tuckey | 137/565 |
| 4,807,582 | 2/1989 | Tuckey | 137/572 |
| 4,831,990 | 5/1989 | Tuckey | 123/514 |
| 4,860,714 | 8/1989 | Bucci | 123/509 |

FOREIGN PATENT DOCUMENTS

| 2607560 | 9/1977 | Fed. Rep. of Germany | 123/509 |
|---|---|---|---|
| 2844053 | 4/1980 | Fed. Rep. of Germany | 123/509 |

*Primary Examiner*—Carl Stuart Miller
*Attorney, Agent, or Firm*—Lawrence J. Shurupoff

[57] ABSTRACT

A vehicle fuel pumping unit wherein a reserve fuel supply container is located within the fuel tank to supply liquid fuel to a motor-operated pump when the tank is nearly empty. The invention addresses the problem of pump starvation when the tank is nearly empty and the liquid fuel is held away from the pump intake passage due to abrupt sustained turning or other maneuvers of the vehicle. In preferred practice of the invention normal fuel flow from the tank to the pump is controlled by an annular float valve located directly below the reserve fuel supply container; fuel flow from the reserve container is controlled by a pressure-responsive valve located in the section path between the container and the pump intake, said pressure-responsive valve being part of a sub-assembly including a liquid fuel filter screen for filtering all fuel from the container and a valve seat for the pressure-responsive valve.

20 Claims, 2 Drawing Sheets

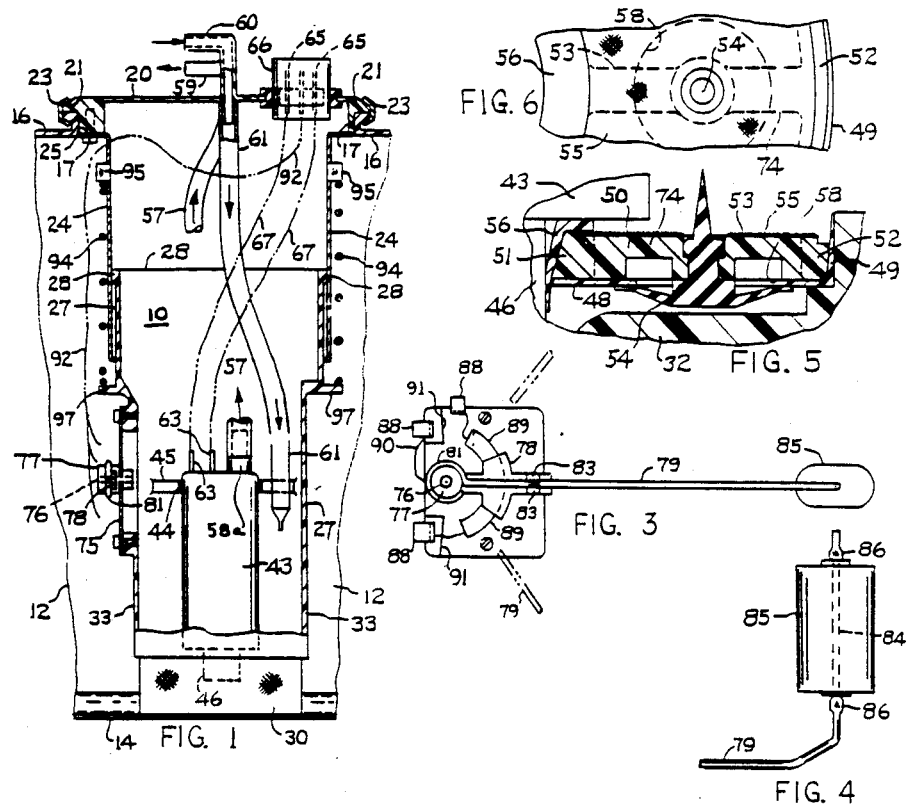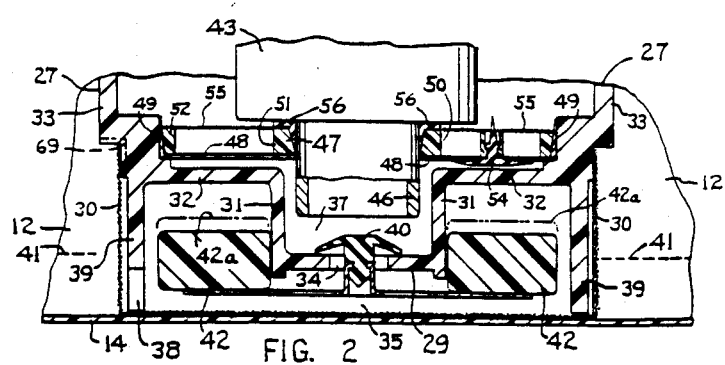

FUEL SUPPLY MODULE

TECHNICAL FIELD

This invention relates to automotive vehicle fuel systems, especially to systems wherein a motor-operated fuel pump is located in a fuel tank to pump liquid fuel (e.g. gasoline or diesel fuel) from the tank to a carburetor or fuel injector mechanism on the vehicle engine.

BACKGROUND ART

The invention is concerned primarily with a problem that occurs when the fuel tank is nearly empty and the vehicle is being driven on hilly terrain or winding roads or being held in a sustained turn as when entering a freeway. In such situations the liquid fuel in the tank can either slosh around or be held to one side of the tank so that the fuel pump is momentarily or intermittently deprived of fuel (the pump loses its prime). This condition can occur even though there is some fuel still in the tank; the fuel tank gage can register the existence of fuel in the tank, but still the fuel is not available to the fuel pump.

The problem has been addressed in certain prior art patents.

For example, U.S. Pat. No. 3,443,519 to J. White shows a vehicle fuel system wherein a fuel pump having two tandem arranged pumping impellers is mounted in a casing within the fuel tank. The first impeller pumps fuel from the tank into a reservoir compartments within the casing. The second impeller pumps liquid out of the fuel tank to the engine carburetor or fuel injector mechanism. There is no return flow of excess fuel from the engine to the reservoir compartments. Consequently, the ability of the pump to retain its prime during this fuel starved condition is solely dependent upon the capacity of the reservoir compartment.

Likewise U.S. Pat. No. 4,672,937 to D. Fales shows a fuel supply system including a complex two stage pump and a solenoid actuated valve which, is response to a signal from a cut-off level flow switch, will render the pump first stage inoperative—while rendering the pump second stage operative to draw fuel from a reservoir.

U.S. Pat. No. 4,747,388 to C. Tuckey discloses a fuel supply system comprising a single stage pump and a flexible filter screen which acts not only as the main tank fuel filter but also as a float and valve actuating mechanism to release fuel from the reservoir. Under normal operating conditions fuel will be supplied to the pump through the flexible filter screen. However, should the space below the filter screen become starved of fuel the screen will be lifted causing a valve to open and thereby enabling fuel to flow from a reservoir into the space above the screen and to the pump.

DISCLOSURE OF INVENTION

In our new arrangement the fuel pump is disposed in a reserve fuel supply container located within the fuel tank. The container is a vertically orientated, two-piece, spring-biased telescoping arrangement extending from the top of the tank to the bottom of the tank, which consequently can readily adjust to fuel tank expansion and contractions. Excess fuel from the engine is caused to flow into the reserve container such that it is always being filled so long as the engine is running. Under normal operations (with sufficient fuel in the tank) the pump intake passage is connected to a primary passage system that includes a float-operated valve. As long as there is sufficient liquid in the tank the float-operated valve supplies fluid to the pump intake passage.

A secondary passage system is provided between the reserve fuel supply container and the pump intake passage, such that when the float-operated valve closes (due to insufficient fuel in the tank) an increased suction force is exerted on a normally closed secondary valve associated with the reserve fuel supply container. The secondary valve then opens so that fuel is then drawn from the reserve container through the secondary passage system into the pump. The secondary valve is a flapper type valve, simply constructed and immediately responsive to the pressure drop within the pump intake passage when the float-operated main valve closes.

In the preferred form the secondary valve is incorporated into a second fuel filtering subassembly which filters the fuel in the reservoir.

One object of our invention is to provide a slosh-compensating fuel pumping system that uses a conventional geroter type positive displacement pump.

Another object is to provide a slosh-compensating fuel pumping system having filtration protection under both operating modes, i.e. when the system is drawing liquid fuel from the tank, and also when the system is drawing liquid fuel from the auxiliary fuel supply reservoir or container.

A further object is to provide a slosh-compensating fuel pumping system wherein the switch over between the normal operating mode and the fuel-interrupted mode is accomplished simply and quickly.

Another object is to provide a slosh-compensating fuel pumping assembly that can be readily installed in and removed from a vehicle fuel tank.

An additional object of the invention is to provide a fuel pumping assembly that can accommodate itself to expansion or contraction of the fuel tank walls, due for example to ambient temperature changes, varying weights of fuel in the tank, partial vacuum conditions incident to withdrawal of fuel from the tank, and varying positive pressure conditions within the tank.

Yet another object is to provide a pumping system that includes a fuel level indicator referenced to the tank bottom wall, such that the indicator maintains its accuracy in spite of expansion or contraction of the tank walls.

A further object is to provide a slosh-compensating fuel pumping assembly that incorporates an electrical liquid fuel level sensor therein, thereby obviating the need for a special access hold in the tank wall for attaching a separate sensor to the tank.

It is also an object of the invention to provide a fuel supply module requiring that, when the fuel tank and reserve container are both substantially empty, i.e. when the vehicle is truly out of fuel, only a small quantity of fuel needs to be poured into the tank to restore the pump to its normal pumping action; i.e. the pump is basically self-priming.

Other objects and features of the invention will be apparent in the following description and claims in which the principles of the invention are set forth together with details to enable a person skilled in the art to practice the invention, all in connection with the best mode presently contemplated for the invention.

BRIEF DESCRIPTION OF DRAWINGS

FIG. 1 is a fragmentary sectional view taken through a fuel pumping unit embodying our invention.

FIG. 2 is an enlarged fragmentary sectional view of structural features used in the FIG. 1 assembly.

FIG. 3 is a side elevational view of a liquid level sensor unit used in the FIG. 1 assembly.

FIG. 4 shows a structural detail used in the FIG. 3 sensor unit.

FIG. 5 is an enlarged fragmentary sectional view taken in the same direction as FIG. 2.

FIG. 6 is a fragmentary top plan view of the structure shown in FIG. 5.

BEST MODE FOR CARRYING OUT THE INVENTION

Figure 7:
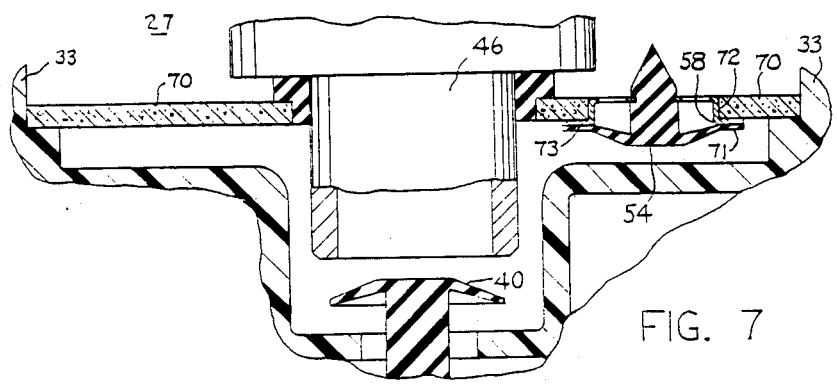
FIG. 7 is a fragmentary sectional view taken in the same direction as FIG. 2, but illustrating an alternative construction usable in practice of the invention.

FIG. 1 shows a fuel pumping unit 10 disposed within a vehicle fuel tank 12. Tank 12 comprises a floor 14 and ceiling 16; a circular access opening 17 is formed in ceiling 16 for manual insertion of pumping unit 10 into the fuel tank.

The pumping unit comprises a cover structure 20 sized to fit into access opening 17, with a peripheral flange 21 thereof resting on the upper flanged surface of ceiling 16. A conventional arcuate clamp 23 may be arranged around the mating flanged surfaces to releasably secure cover structure 20 in a fixed position above access opening 17.

Depending from cover structure 20 is an arcuate (substantially cylindrical) guide means 24, preferably formed of brass or other non-corroding metal. Ears 25 extend outwardly from the upper end of the arcuate guide means to fixedly secure the guide means to cover structure 20.

The arcuate guide means has a slidable telescopic fit on the outer edge of a vertical tubular container 27. In plan view container 27 is circular, although circularity is not essential to practice of the invention. The container has a smaller diameter than access opening 17, such that the fuel pumping unit (comprised of cover structure 20, guide means 24 and container 27) can be withdrawn as a unit through access opening 17, e.g. when it is desired to repair or replace the pumping unit.

Container 27 has an upper flanged end 28 located within the space circumscribed by arcuate guide means 24. The lower end of container 27 is disposed within a cup-shaped filter screen 30 that is designed to rest against the fuel tank floor 14. The detailed construction of the lower end of container 27 is best seen in FIG. 2.

As shown in FIG. 2, the container 27 bottom wall includes a central wall section 29 in close proximity to tank floor 14, a tubular wall section 31 extending upwardly from wall section 29, and laterally-extending wall section 32. Wall section 32 connects with container side wall 33. In normal operation the space around container 27 contains liquid fuel. Also, some reserve fuel is contained within container 27.

A flow port 34 is formed in central wall section 29 to enable liquid fuel to flow upwardly from space 35 below wall section 29 to a central fuel chamber 37 above wall section 29. Space 35 is in open communication with fuel tank 12 via one or more openings 38 in leg structure 39.

A primary valve element 40 is arranged in central fuel chamber 37 to open or close port 34, depending on the position of attached float 42. Valve element 40 is made of synthetic rubber or other elastomer. It includes a cup shaped top portion defining an annular flexible outer flange, the tip of which defines a seal lip which engages and acts as a seal over port 34 in one position of the float. Depending from the top portion of valve 40 is a relatively firm annular core having a bayonet tip at its other end. The valve element 40 is fixed to a rigid plate 11 by means of a locking groove within the bayonet tip and the rigid plate 11 is in turn fixed to float 42. Thus float 42, plate 11 and valve element 40 are one subassembly. Rigid plate 11 has ports 13 arranged about its inner diameter to facilitate fuel flow through ports 34.

The float 42 is preferably an annular member, preferably formed of a low density material. The float can be a solid structure, as shown, or a hollow structure formed by a blow molding process. The float is designed so that when the liquid level in the tank 12 falls to some predetermined low cut-off value the float drops down to the full line position (FIG. 2) to cause the attached valve element 40 to close port 34. The cut-off level is designated by numeral 41 in FIG. 2.

At normal fuel levels (above the cut-off level) float 42 is buoyed upwardly to the dashed line position 42a (FIG. 2), to thereby cause valve element 40 to open port 34.

Arranged centrally within container 27 is a motor-operated fuel pump 43 of known construction. A preferred pump construction is offered by the Carter Automotive Company of St. Louis, Mo. under the tradename CARotor. The pump is a geroter-type positive displacement pump that includes a male gear eccentrically disposed within an annular internal gear for achievement of a liquid pump action; an electric motor is located within the upper section of the pump body to drive the gears. Such a pump is shown in U.S. Ser. No. 101,265 filed Sept. 25, 1987, now U.S. Pat. No. 4,820,138, the contents of which are incorporated herein by reference.

The preferred pump 43 is supported near its upper end by means of a ring 44 and spoke structure 45 extending inwardly from container side wall 33. At its lower end the pump has a tubular liquid intake passage 46 extending downwardly through an annular valve-filter assembly 47.

The illustrated assembly 47 comprises a flat annular plate 48 having an annular upstanding peripheral flange 49 sealably engaged with the inner surface of container 27. An annular spacer member 50 is positioned on plate 48 to support an annular filter screen 55. Members 48, 50 and 55 are preferably plastic components secured together with solvent adhesives. Member 50 includes two concentric annular sections 51 and 52 interconnected by three circumferentially spaced radial ribs 53, only one of which appears in the drawings at FIG. 6. Illustrated rib 53 forms a mounting means for an elastometric deflectable disk-shaped reserve valve element 54 similar to valve 40 whose outer peripheral edge seals against the lower face of plate 48. A circular port 58 is formed in plate 48. Also, an annular flanged seal member 56 (as seen in FIG. 5) is carried on spacer member 50 to preclude downflow of liquid fuel along the outer surface of pump intake passage 46.

The space in container 27 above strainer screen 55 is normally filed with liquid fuel. However the flow resistance offered valve element 54 is higher than the resistance offered by flow port 34 when the flow port is open (with float 42 buoyed up to the dashed line position in FIG. 2). Therefore, when port 34 is opened all of the liquid flowing upwardly into intake passage 46 will be coming from port 34. None of the liquid will be coming from container 27.

Motor-operated pump 43 has an output passage (spigot) 58a at its upper end. A flexible flow tube 57 extends upwardly from passage 58a to a fuel outflow spigot 59 that extends through cover structure 20; spigot 59 is only partially visible in FIG. 1. Another return fuel flow spigot 60 extends through cover structure 20 to connect with a second flexible flow tube 61. Tube 61 extends downwardly into container 27 to deliver pump overflow liquid back into the container.

The illustrated pumping unit delivers liquid fuel through spigot 59 to a line leading to the engine (carburetor or fuel injector mechanism). Excess fuel not used by the engine is returned through a line that connects to spigot 60. The excess fuel is thus fed back into container 27, such that container 27 is ordinarily always filled to its upper edge 28 as a constant running condition. The excess fuel overflows edge 28 through open areas of guide means 24 and spills back into the fuel tank.

Electrical power is delivered to the pump motor through spade terminals 63 located at the upper end of the pump casing. Electrical current is supplied from an outside source (the vehicle battery) to pin terminal 65 in an electrical receptacle 66; flexible wiring 67 transmits the power to spade terminals 63.

During normal operations (with sufficient fuel in tank 12) float 42 is buoyed up so that valve element 40 is open. Liquid fuel is supplied to pump intake passage 46 through port 34. Container 27 will be completely filled with liquid fuel. However, the flexural resistance of valve element 54 is such that no liquid is taken from container 27 into space 37 below pump intake passage 46. As fuel is used by the engine, container 27 will remain filled while the level in tank 12 drops.

When the liquid level in tank 12 drops below the cut-off level 41 (FIG. 2) float 42 moves down to cause valve element 40 to close port 34. The pump suction in central fuel chamber 37 is then applied solely to the underside of deflectable valve element 54, such that liquid fuel is then drawn from container 27, through filter screen 55 and around edge areas of valve element 54 into central fuel chamber 37. The pump is able to continue pumping liquid upwardly through flexible flow tube 57, even though the fuel in tank 12 is sloshing or draining away from the space below port 34 due to vehicle turning maneuvers. The vehicle can be kept running until substantially all the total system fuel is empty, including that in the return loop and the reserve container.

In connection with the operation of valve element 54, it should be noted that the undersurface of element 54 is exposed to the liquid head in tank 12 (through port 34), whereas the upper surface of element 54 is exposed to the liquid head in container 27. The port opening in plate 48 limits the surface area exposure of element 54, such that element 54 will be maintained in a closed position even when the liquid head in tank 12 is less than the liquid head in container 27. However, when valve element 40 closes port 34 the undersurface of element 54 is no longer exposed to the tank liquid head. The pressure head in container 27 quickly opens element 54.

Should tank 12 and container 27 be entirely emptied when the vehicle is in an area away from a vehicle service area it is then necessary to pour a small quantity of fuel into the tank so that the vehicle can be driven to a service station. A gallon of fuel is sufficient in most instances to raise float 42 and thereby open valve element 40 and prime the system. At this time valve element 54 is closed.

Under some conditions the minute openings in screen 30 may be clogged with liquid fuel at the time new fuel is being poured into tank 12; additionally the space 35 circumscribed by screen 30 may be air-filled. Under the worst case situation the liquid poured into tank 12 will be unable to flow into space 35. To avoid an air-lock condition in space 35 a small slot-like air vent passage 69 (FIG. 2) may be formed in container wall 33; this slot-like passage will act to vent air from space 35 out into the tank, thereby enabling new fuel to readily flow into space 35.

When pump 45 is operated the pump suction will be exerted on the liquid at flow opening 34. The pump is able to draw fuel through the intake passage 46 and thus keep the vehicle running until the motorist reaches the nearest gas station.

In a preferred form of our invention the fuel pumping unit (comprising guide means 24 and container 27) acts as a mounting device for a tank liquid level sensor. The sensor can be connected to a fuel quantity gage and/or a low level alarm (not shown). The sensor shown in FIGS. 1 and 3 comprises a mounting plate 75 having a screw type attachment to a flat flanged section formed on the side of container 27. A steel pin 76 is embedded into plate 75 to form a pivot structure for a rotary hub structure 77.

Integrally connected to hub structure 77 is a plastic plate 78 of wing-like configuration (FIG. 3). A rod-like arm 79 has an arcuate curved end section 81 curled around hub structure 77 to affix the rod-like arm and hub structure together. In order to prevent undesired wobble of arm 70 the rod is trained through two upstanding gripper fingers 83 formed integrally with plate 78. Arm 79 and hub structure 77 rotate as a unit around the pivot axis defined by steel pin 76.

As best seen in FIG. 4, the free end of arm 79 is turned, as at 84, to extend through a paddle-shaped float 85. Localized areas of arm 79 are flattened, as at 86, to retain the float on the arm. However, the float can rotate on arm section 84 so as to remain "flat" on the liquid level surface as arm 79 swings between its limiting positions, shown in dashed lines in FIG. 3.

The ends of wing-shaped plate 78 are arranged to contact stop surfaces (upstanding shoulders) 91 formed on mounting plate 85. Stop surfaces 91 define the motion limits for arm 79.

Electrical spade terminals 88 are suitably mounted in plate 75 to form electrical connectors to an electrical slider and associated potentiometer resistance. The potentiometer resistance comprises one or more arcuate conductive strips 89 formed on the outer face of plastic plate 75. The electrical slider is a thin copper strip extending from hub structure 77 in the space behind plastic plate 78. A flexible lead wire 90 connects the electrical slider to a terminal 88.

Alternatively, a slider-slip ring electrical connection can be substituted for the flexible wire 90.

Electrical liquid level signals are transmitted from the sensor mechanism through multi-strand flexible wiring 92 that connect terminals 88 to selected pin terminals in receptacle 66. The electrical liquid level sensor mechanism is thereby operatively located on the fuel pumping unit, thus avoiding the necessity for a separate mounting structure (and electrical wiring connectors) for the liquid level sensor.

The pumping unit shown in FIG. 1 can be installed into the fuel tank (or removed from the fuel tank) by moving the unit through access opening 17 in tank ceiling 16. Float 85 extends a short distance laterally beyond the plan dimension of the pumping unit. However, it is possible to tilt the unit slightly to enable the float the move through access opening 17. It is not necessary to disassemble the float or mounting plate 75 to install the pumping unit into the fuel tank.

The fuel tank is often formed of plastic or other material subject to deformation (buckling), due for example to thermal contraction or expansion, or the weight of fuel in the tank, or semi-vacuum conditions due to withdrawal of liquid from the tank. Such conditions can cause the space between the tank floor 14 and ceiling 16 to vary from time to time.

In order to keep container 27 a constant predetermined distance above tank floor 14 our pumping unit 10 comprises spring means 94 for biasing container 27 downwardly toward floor 14. As shown in FIG. 1 the spring means comprises an annular compression spring 94 surrounding arcuate guide means 24. The upper end of spring 94 engages a seat structure formed by tangs 95 struck outwardly from the surface of guide means 24. The lower end of spring 94 engages a seat structure formed by an annular flange 97 formed on container 27.

Spring 94 exerts a downward force on container 27, whereby the container maintains a predetermined spatial relationship to tank floor 14 in spite of variations in the spacing between floor 14 and ceiling 16. The liquid level sensor is referenced to floor 14 such that fuel tank deformation has minimal effect on the readout.

FIG. 7 illustrates a second form that the invention can take. The structure is substantially the same as the FIG. 2 structure except that valve-filter assembly 47 is replaced by a secondary valve means having no filter and comprising only an annular plate 70 having flow openings 72 therethrough. An elastomeric valve element 73 similar to valve element 54 is suitably attached to the undersurface of plate 70 such that liquid in the reservoir 27 exerts a force through flow openings 72 onto the upper face of the disc.

Flow openings 72 are segmental openings defined by spoke sections of plate 70; the central hub area within openings 72 acts as a mounting mechanism for a central rigid section of elastomeric valve element 73. The peripheral sections of valve element 73 are deflectable downwardly away from the valve seat defined by plate 70 as a response to the weight of liquid in reservoir 27.

With primary valve 40 in an open position, valve element 73 will remain closed as long as the level of liquid in container 27 is below a predetermined value, e.g. up to about seven inches above plate 70. Should the container liquid level exceed that predetermined value the increased weight of liquid will act through flow openings 72 to deflect the peripheral areas of valve element 73 downwardly. The secondary valve will thereby supply some liquid to space 37 below the pump intake passage.

When the liquid level in tank 12 drops below cut-off level 41 primary valve 40 closes. An increased suction force is thereby applied to the undersurface of secondary valve disc 73. The increased force completely opens the valve element 73 and holds it open even though the liquid level in container 27 may drop below the aforementioned seven inch level. As with the system shown in FIG. 2 fuel will be supplied from reservoir 27 through valve element 73 until all fuel in the system is used.

While the best mode for carrying out the invention has been described in detail, those familiar with the art to which this invention relates will recognize various alternative designs and embodiments for practicing the invention as disclosed by the following claims.

What is claimed is:

1. In association with an automotive vehicle fuel tank; and upright fuel supply reserve container adapted to be placed within such tank; a motor-operated pump located within said container; said pump having an intake passage communicating with the fuel tank through a first passage system, and with the reserve container through a second passage system; said pump further having an outflow passage communicating with the vehicle engine through a third passage system, and said container including a fourth passage system for conveying excess fuel from the vehicle engine directly to the container;

a primary valve means controlling flow through the first passage system so that the pump receives its liquid supply from the fuel tank except when the tank is substantially empty;

a reserve valve means controlling flow through the second passage system so that when the fuel tank is substantially empty the pump receives its liquid supply from the reserve fuel supply container;

said reserve valve means comprising a plate having a flow port therethrough, and a deflectable reserve valve disposed on the undersurface of said plate so that the upper surface of said reserve valve communicates with said reserve container through the flow port; said reserve valve having its undersurface in fluid communication with the fuel tank and being normally at least substantially closed such that when the primary valve means is in an open position the pump will draw fuel at least substantially only from the fuel tank exclusive of that within the reserve container; said flow port being dimensioned so that the disk area in fluid communication with the container is substantially less than the disk area in fluid communication with the fuel tank.

2. The combination of claim 1 wherein said primary valve means comprises an annular float-operated primary valve located in axial alignment with the pump intake passage.

3. The combination of claim 2 wherein said pump intake passage comprises a vertical tube, said first passage system and said second passage system being separated by an annular wall surrounding said pump intake tube.

4. A reserve fuel system for a fuel tank, comprising:
a fuel supply reserve container adapted to be positioned in said tank;
a fuel pump operatively associated with said reserve container;
float valve means operatively associated with said pump, said float valve means adapted to provide liquid fuel to said pump at tank fuel levels above a predetermined fuel level and to block liquid fuel from said tank below said predetermined fuel level; and
a pressure responsive reserve valve for delivering liquid fuel from said reserve container to said pump at fuel levels below said predetermined fuel level.

5. The system of claim 4 and further comprising a filter screen arranged in said reserve container to intercept and filter liquid fuel flowing across the reserve valve.

6. The system of claim 4 wherein said reserve container includes an outlet port; said fuel pump being located within said reserve container and having an intake passage; said float valve means being mounted within said reserve container and below the pump intake passage; and said reserve valve being responsive to changes in pump intake pressure for delivering fuel from the reserve container through said outlet port to the pump intake passage when the tank liquid level falls below said predetermined fuel level.

7. The system of claim 6 wherein said outlet port defines a valve seat means, said reserve valve being arranged below said valve seat means such that liquid fuel within said reserve container exerts a force tending to move said reserve valve to an open position.

8. The system of claim 7 wherein the reserve valve is an elastomer and includes a relatively rigid central section and a deflectable peripheral section; said valve being constructed so that the peripheral section deflects downwardly away from the aforementioned valve seat means when the liquid level in the tank drops below said predetermined fuel level.

9. The system of claim 6 wherein the pump intake passage comprises a vertical tube arranged substantially on the central axis of the reserve container; said pump intake passage, said float valve means and said reserve valve all communicating with a common central fuel chamber; and said float valve means comprising a valve-float assembly centered on the axis of said vertical tube.

10. The system of claim 9 wherein said valve-float assembly includes an annular float and an associated valve located within the space circumscribed by the annular float, said associated valve acting to close said central fuel chamber to create a pressure drop across said reserve valve and thereby provide fuel from the reserve container to said pump intake passage.

11. In combination with an automotive vehicle fuel tank having a floor; a vertically arranged fuel supply reserve container positioned in said tank and having an outlet port; a motor-operated fuel pump located within said reserve container; said pump having an intake passage spaced a predetermined distance above the tank floor; a float valve means operatively mounted below the pump intake passage for supplying liquid fuel thereto except when the tank liquid level falls below a predetermined cut-off level in near adjacency to the tank floor; and a reserve valve responsive to changes in pump intake pressure for delivering fuel from the reserve container through said outlet port to the pump intake passage when the tank liquid level falls below said cut-off level; said fuel tank including a ceiling located a substantial distance above the floor; an access opening formed in said tank ceiling; and means for locating the fuel supply reserve container in a predetermined position in the fuel tank; said locating means comprising a cover structure positionable on the tank ceiling directly above the access opening, and a guide means extending downwardly from the cover structure and having a concentrically disposed telescopic fit with the container.

12. The combination of claim 11 and further comprising spring means trained between the guide means and the reserve container for biasing said reserve container downwardly away from the cover structure, whereby when the cover structure is secured to the tank ceiling the reserve container will move with the tank floor to compensate for temporary variations in the ceiling-floor spacing.

13. The combination of claim 12 wherein the cover structure, guide means and reserve container are interconnected to form a unitary assembly that can be handled as a unit when installing or removing the reserve container.

14. The combination of claim 11 wherein said reserve container is a cylindrical container having a first outwardly-extending flange at its upper end and a second outwardly-extending flange a short distance below the first flange; said guide means comprising an arcuate wall structure substantially encircling the cylindrical container so that the inner surface of the arcuate wall structure rides on the edge surface of the first flange.

15. The combination of claim 14 and further comprising annular compression spring extending around the outer surface of said arcuate wall structure; said second flange on the container forming a first seat the lower end of the compression spring; a second seat extending outwardly from the arcuate wall structure near its upper end; said second seat being engaged with the upper end of the compression spring whereby the compression spring urges the container downwardly toward the tank floor to compensate for temporary variations in the ceiling-floor spacing.

16. The combination of claim 11 and further comprising a tank liquid level sensor mounted on an outer surface of the fuel supply container.

17. The combination of claim 16 wherein the liquid level sensor comprises a mounting plate, an electrical resistance on the outer face of the mounting plate, an arm structure swingably mounted on the mounting plate for arcuate motion in a vertical plane, a float connected to the free end of the arm structure, and an electrical slider movable with the arm structure across the electrical resistance.

18. The combination of claim 16 and further comprising an electrical receptacle mounted in the cover structure, said receptacle having pin terminals extending there through to electrically communicate the zone above the cover structure with the zone below the cover structure; first flexible wiring connecting the liquid level sensor with selected ones of the pin terminals, and second flexible wiring connecting the fuel pump motor with other ones of the pin terminals.

19. The combination of claim 11 and further comprising a fuel outflow spigot extending through the cover structure, a first flexible flow tube extending from the pump upwardly to said outflow spigot, a return fuel spigot extending through the cover structure, and a second flexible flow tube extending downwardly from the return fuel spigot into the container.

20. In association with an automotive fuel tank having a floor; an upstanding tubular container positioned within the fuel tank for containment of a reserve fuel supply; a motor-operated fuel pump located with the container;
  said container comprising a bottom wall that includes a central wall section in close proximity to the tank floor, a tubular wall section extending upwardly from said central wall section, and a laterally-extending wall section radiating away from the upper end of the tubular wall section; a flow port in said central wall section;

said fuel pump having a tubular intake passage extending downwardly within the tubular wall section of the container bottom wall in spaced relation thereto;

and annular float surrounding the tubular wall section of the container bottom wall for movement in response to changing liquid levels;

a valve element located within the space circumscribed by the tubular section of container bottom wall for closing or opening the flow port in the central section of the container bottom wall;

means operatively connecting the valve element to the annular float, whereby the valve element moves in accordance with changes in the position of the float; and an annular wall located directly above said laterally-extending wall section; a second flow port through said annular wall; and a pressure-responsive valve disposed on the undersurface of said annular wall in alignment with said second flow port for controlling downflow of liquid from the container to the pump intake passage.

* * * * *

UNITED STATES PATENT AND TRADEMARK OFFICE
CERTIFICATE OF CORRECTION

PATENT NO. : 4,974,570

DATED : December 4, 1990

INVENTOR(S) : Jesse L. Szwargulski, Larry L. Lachalmelle,
John B. Fitzgerald, Gregory B. Schoenberg It is certified that error appears in the above-identified patent and that said Letters Patent is hereby corrected as shown below:

Column 1, line 41, "is" should read -- in --

Column 1, line 65, "contractions" should read -- contraction --

Column 8, claim 1, line 11, "and" should read -- an --

Column 10, claim 15, line 20, before 'annular' insert thereat -- an --

Column 10, claim 15, line 22, after 'seat' insert thereat -- for --

Column 10, claim 20, line 60, "with" should read -- within --

Column 11, claim 20, line 5, "and" should read -- an --

Signed and Sealed this

Sixth Day of October, 1992

*Attest:*

DOUGLAS B. COMER

*Attesting Officer*       *Acting Commissioner of Patents and Trademarks*